US008322604B2

(12) United States Patent
Haycock et al.

(10) Patent No.: US 8,322,604 B2

(45) Date of Patent: Dec. 4, 2012

(54) SYSTEM AND METHOD FOR INDEPENDENT VERIFICATION OF CIRCULATING BANK NOTES

(75) Inventors: Richard Glen Haycock, West Vancouver (CA); Francisco Manuel Lopez, Soberton Southampton (GB)

(73) Assignee: Intelligent Currency Solutions, South Hampton (GB)

( * ) Notice: Subject to any disclaimer, the term of this patent is extended or adjusted under 35 U.S.C. 154(b) by 0 days.

(21) Appl. No.: 13/176,492

(22) Filed: Jul. 5, 2011

(65) Prior Publication Data

US 2011/0264261 A1 Oct. 27, 2011

Related U.S. Application Data

(63) Continuation of application No. 12/022,006, filed on Jan. 29, 2008, now Pat. No. 8,047,426.

(51) Int. Cl.

| | |
|---|---|
| ***G06Q 40/00*** | (2012.01) |
| ***G07D 11/00*** | (2006.01) |
| ***G07F 19/00*** | (2006.01) |

(52) U.S. Cl. .......................................................... 235/379

(58) Field of Classification Search .................. 235/379, 235/435, 440, 454; 356/71; 250/556, 559.01, 250/559.03–559.08, 559.27, 559.39, 559.44–559.48; 382/135, 137–140; 209/534; 194/206, 20, 194/210, 212, 213; 434/110; 705/39, 45

See application file for complete search history.

(56) References Cited

U.S. PATENT DOCUMENTS

| | | | | |
|---|---|---|---|---|
| 4,464,787 | A | 8/1984 | Fish et al. | |
| 4,653,647 | A | 3/1987 | Hashimoto | |
| 4,694,963 | A | 9/1987 | Takesako | |
| 4,723,072 | A | 2/1988 | Naruse | |
| 5,055,834 | A | 10/1991 | Chiba | |
| 5,615,280 | A | 3/1997 | Izawa et al. | |
| 5,855,268 | A * | 1/1999 | Zoladz, Jr. | 194/207 |
| 6,595,510 | B2 | 7/2003 | Kayani | |
| 6,601,687 | B1 | 8/2003 | Jenrick et al. | |
| 6,724,927 | B2 | 4/2004 | Jones et al. | |
| 6,797,974 | B2 | 9/2004 | Philipp et al. | |
| 6,860,375 | B2 | 3/2005 | Hallowell et al. | |
| 6,994,200 | B2 | 2/2006 | Jenrick et al. | |

(Continued)

FOREIGN PATENT DOCUMENTS

EP 1324285 A2 7/2003

*Primary Examiner* — Michael G Lee

*Assistant Examiner* — Suezu Ellis

(74) *Attorney, Agent, or Firm* — Shaukat A. Karjeker; Colin P. Cahoon; Carstens & Cahoon, LLP

(57) ABSTRACT

A system and method for independently verifying a bank note processor's handling of circulating bank notes. Independent detectors are provided along the transport path of a bank note processing device. Also provided is at least one independent memory storage device for logging data from the independent detectors. As the note passes along the transport path, the independent detectors evaluate the note's fitness. The independent detector data is subsequently provided to the central bank or commercial organization for auditing of the bank note processor and for generating bank note statistics. Independent detectors may also be used on the transport path output bins to corroborate the other detectors and to verify the integrity of the sorting logic. Mirrored independent detectors allow for corroborating independent data. The invention is operable on any bank note processing device that performs at least a subset of a fitness determination on each note.

8 Claims, 8 Drawing Sheets

U.S. PATENT DOCUMENTS

| | | | |
|---|---|---|---|
| 7,146,245 | B2 | 12/2006 | Jones et al. |
| 7,185,749 | B2 | 3/2007 | Armanini et al. |
| 7,256,874 | B2 | 8/2007 | Csulits et al. |
| 7,349,075 | B2 | 3/2008 | Fujimoto et al. |
| 7,359,543 | B2 | 4/2008 | Tsuji et al. |
| 2002/0066125 | A1 | 5/2002 | Mukai |
| 2004/0154964 | A1 | 8/2004 | Jones |
| 2004/0255354 | A1 | 12/2004 | Graef et al. |
| 2005/0040225 | A1 | 2/2005 | Csulits et al. |
| 2007/0078560 | A1 | 4/2007 | Jones et al. |
| 2007/0122023 | A1 | 5/2007 | Jenrick et al. |

* cited by examiner

SYSTEM AND METHOD FOR INDEPENDENT VERIFICATION OF CIRCULATING BANK NOTES

CROSS-REFERENCE TO RELATED APPLICATIONS

This application is a continuation of U.S. patent application Ser. No. 12/022,006, filed Jan. 29, 2008 now U.S. Pat. No. 8,047,426.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to the field of currency processing, and, more specifically, to a modification to a currency processing device with methods of use for automatically and independently verifying the integrity of currency processing policies and procedures as practiced by banks.

2. Description of Related Art Including Information Disclosed Under 37 CFR 1.97 and 1.98

A central banking system typically handles billions of dollars in bank notes on a given business day. Each of these individual notes must be evaluated for fitness prior to its redistribution to a depository institution and, ultimately, to the public. To process such a staggering number of notes, the central bank outsources the fitness sorting duties to other banks and depository institutions. Sometimes these banks and depository institutions must even outsource their fitness sorting duty to other third party processors.

As bank notes are used by the public, they are subject to abuse and wear that may render them unfit for further circulation. A note may become torn or soiled to the point that it is difficult to determine its denomination. Further, the central bank periodically pulls certain series of notes from circulation in order to introduce a new series or design. For example, a new series of notes may be required to honor a certain dignitary or luminary.

The fitness sorting criteria for bank notes is fairly standard. When evaluating a bank note for fitness, the processor usually must determine if the note is (a) the correct denomination; (b) genuine, and not a counterfeit; (c) a series approved for recirculation; (d) free from excessive holes, tears, tape, or otherwise folded or partially missing; (e) has uniform brightness and is free from excessive soiling; and (f) is free from excessive wear, particularly in the portrait area. To perform this fitness sorting on such a large volume of notes, automated currency sorting and counting machines are often utilized.

A typical sorting machine as used by a bank note processor is shown in FIG. 1. A random stack of bank notes is place in the input receptacle. A feeder device feeds one note at a time through the machine along a transport path toward output receptacles. As the notes traverse the path, sensors detect and evaluate the individual notes. A flip-type counting machine is shown in FIG. 2. This type of machine follows a similar process in that a stack of bank notes is placed in the input hopper. A flipping device moves one note at a time to the output receptacle, counting and evaluating for fitness each individual note. For each machine, fitness data is captured for use by the central bank.

The central bank is ultimately responsible for the quality and quantity of circulating bank notes. As such, it relies heavily on bank note fitness data and statistics reported to it by bank note processors. Each processor must therefore ensure that its sorting machine sensors are consistent across all sites/processes/equipment, are properly calibrated, and are returning accurate data. However, processors often fail to maintain and properly calibrate these sensors for various reasons.

Certain bank processors may not want their machines reporting accurately because of potential penalties that may be imposed by the central bank. For example, the bank note processor may be fined if the machine throughput is too low, or if too many counterfeit bills are detected. Discovery of a counterfeit note yields substantial inconvenience to a bank note processor; bureaucratic investigative services must be engaged in order to track the counterfeit note's origin.

Further, if the machine is calibrated properly it may reject too many notes due to damage, soil, or excessive wear. The bank note processor might be penalized for rejecting too many notes by not having enough remaining notes with which to conduct business or by incurring excess cross-shipping fees when ordering new notes. Thus, substantial disincentives exist for bank note processors to maintain proper calibration and to report accurate note fitness statistics.

Many bank note processing equipment vendors build automated reporting and auditing capabilities into their processing equipment. These capabilities are often provided by specialized software that utilizes data obtained from the original detectors and sensors. Consequently, this attempted solution may induce the same inaccuracies into the supposedly "objective" auditing data. This is so because it does not consider the fact that sensor calibration may have been altered. Therefore, this is not a true independent objective source of auditing data.

Accordingly, a need exists for a modification to bank note processing machine to provide independent verification of bank note processing that is unrelated to any detecting or computing portions of the given machine. Further, this modification should allow independent detection of manual manipulation by a processor of the sensors on a bank note processing machine. Further, this modification should be installable on existing bank note processing machines to preclude purchase of additional systems. Further still, this modification should operate automatically and independently, yet in unison with the machine's onboard sensors such that it does not impede the speed and efficiency of the overall fitness sorting or counting process. Further still, this modification should automatically report this independent verification data to the central bank or commercial organization for ease of processing. The present invention is intended to satisfy these need and others.

BRIEF SUMMARY OF THE INVENTION

The present invention provides a system for modifying a bank note processing machine and a method to automatically and independently verify the fitness sorting or counting process of the machine to which it is attached. The invention works automatically and independently, yet in unison with the fitness evaluating detection systems found onboard existing bank note processing equipment. This equipment to which it applies includes all bank note counters and sorters that perform some type of bank note fitness detection.

Independent detectors and/or sensors (together, the "evaluation circuitry") are provided that evaluate, for fitness, each bank note being processed. The independent evaluation circuitry may mirror the exact detection and sensing capabilities of the respective bank note processing machine, or may provide a subset of the overall detection capabilities. This circuitry is also tamper resistant to prevent misuse and tampering by the bank note processor entity or equipment operator and to ensure accurate data reporting.

The independent evaluation circuitry evaluates each individual bank note and logs the raw evaluation data in a memory storage device. In another embodiment, the system makes an actual fitness determination based on this raw data for comparison with the processing machine's fitness determination. Periodically, the memory storage device forwards this data to the central bank or a designated commercial organization (such as, but not limited to: other banks, CIT's, commercial processors, bank note producers, substrate manufacturers, auditing third parties, etc.) by some secure means (such as, but not limited to: a secure Internet connection, a VPN, a private network, or even by courier). This independent data allows the central bank to efficiently and effectively audit the bank note processor's equipment and processes.

One embodiment provides independent evaluation circuitry along the bank note transport path within the machine. This allows the evaluation circuitry to check bank note fitness prior to the machine acting on its fitness determination and routing the bank note to the designated output receptacle. In another embodiment, the evaluation circuitry is also placed at the output receptacles immediately following the machine's logic section. This allows for independent verification of the logic that controls which output receptacle is to receive the bank note.

In another embodiment, the system provides dual sets of independent evaluation circuitry. This configuration allows dual evaluations to occur, sometimes even simultaneously, in order to provide increased quality control. With two sets of evaluation circuitry, the answers may be compared to achieve a higher probability of accuracy.

These and other improvements will become apparent when the following detailed disclosure is read in light of the supplied drawings. This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein.

Figure 8:
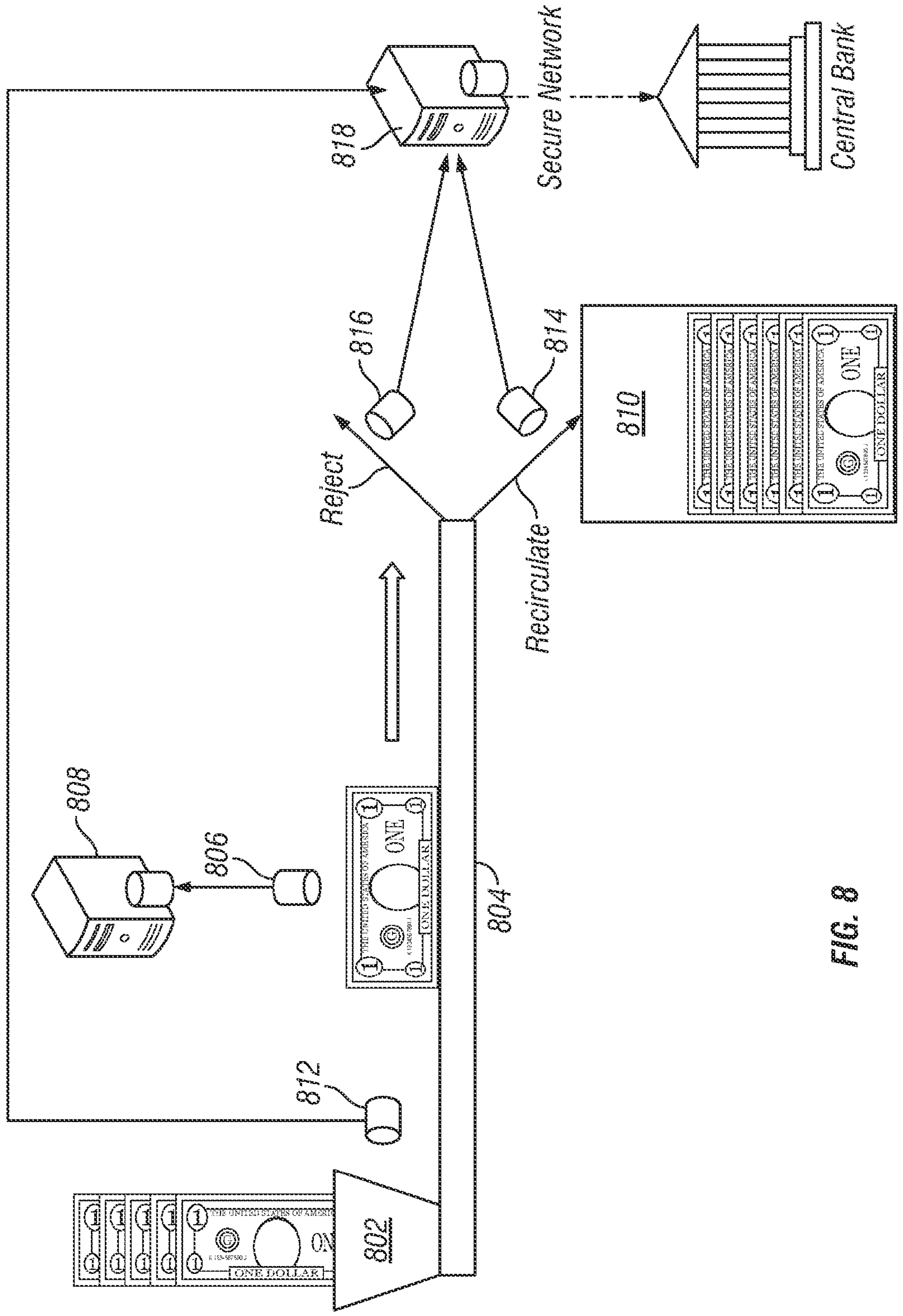
Figure 9:
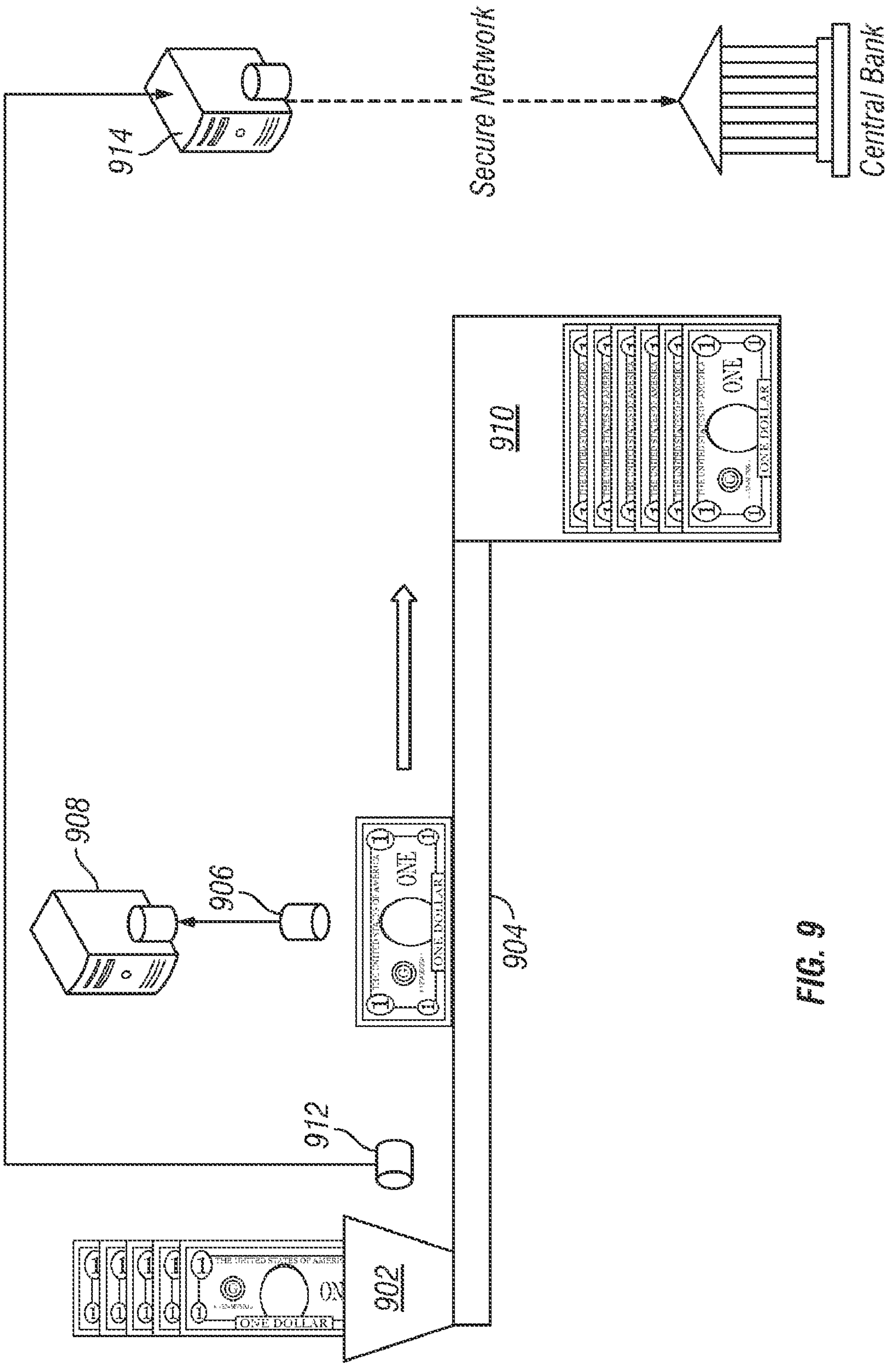

FIG. 8 is a diagram of an embodiment of the present invention as it is used with a typical teller cash recycler, with independent evaluation circuitry placed along the input bin to verify what is being accepted, on the output to verify what is returning to circulation, and, optionally, on the reject path to verify what is being rejected; and FIG. 9 is a diagram of an embodiment of the present invention as it is used with a typical self-service deposit machine, with independent evaluation circuitry placed along the input feeder to verify the notes being deposited.

The above figures are provided for the purpose of illustration and description only, and are not intended to define the limits of the disclosed invention. Use of the same reference number in multiple figures is intended to designate the same or similar parts. Furthermore, if the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood. (58,266).

DETAILED DESCRIPTION OF THE INVENTION

As used herein, the terms "note" and "bank note" are intended to refer to any and all types of bank notes or currency notes subject to processing utilizing the sorting and counting equipment described. Further, the term "detector" is intended to refer to any sensor or detector used for evaluating the characteristics of a bank note.

Figure 1:
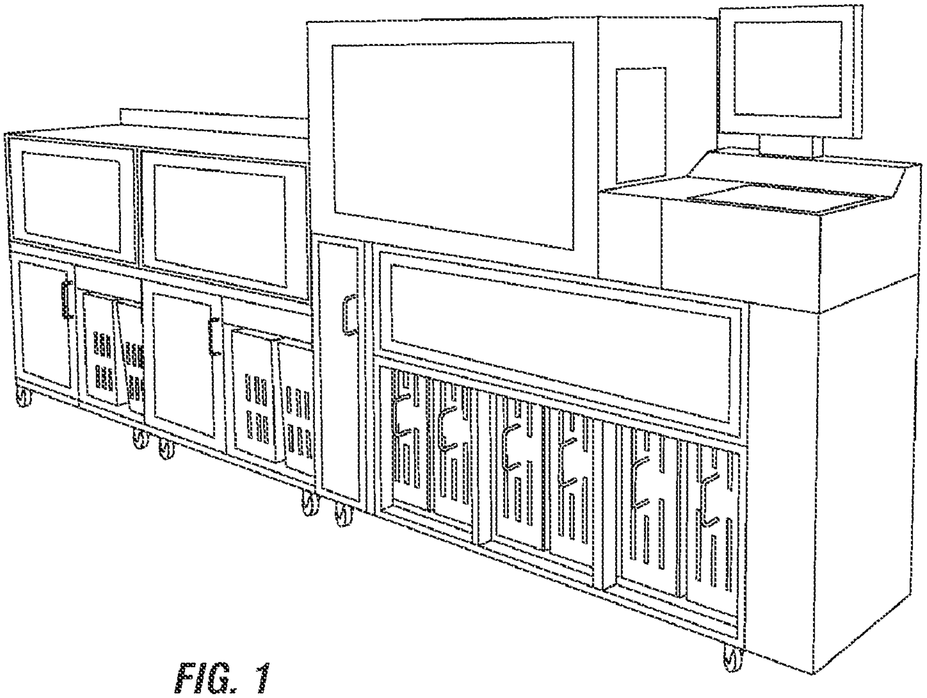
FIG. 1 (Prior Art)
FIG. 1 is a depiction of a bank note sorter machine as is commonly used in the industry.
Figure 2:
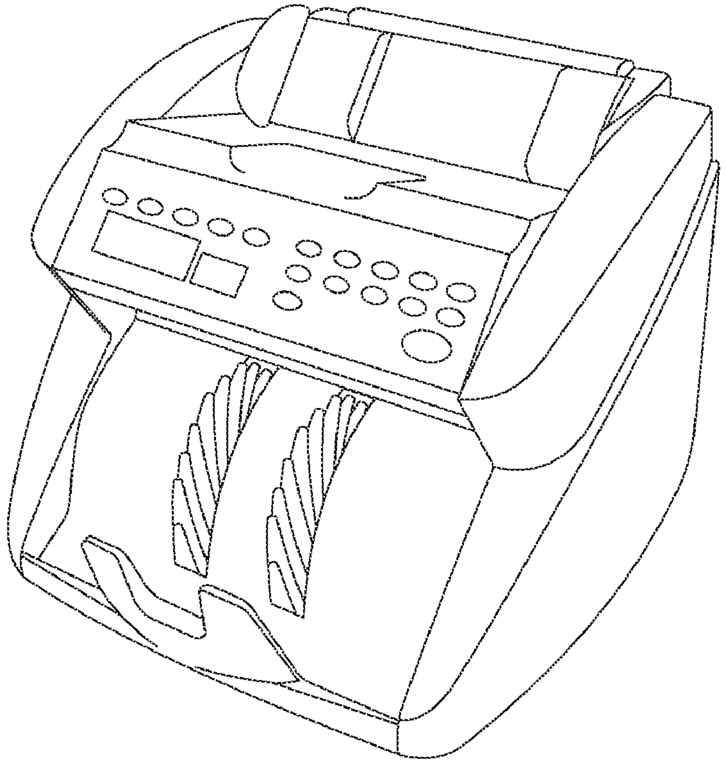
FIG. 2 (Prior Art)
FIG. 2 is a depiction of a bank note flip counter as is commonly used in the industry.
Figure 3:
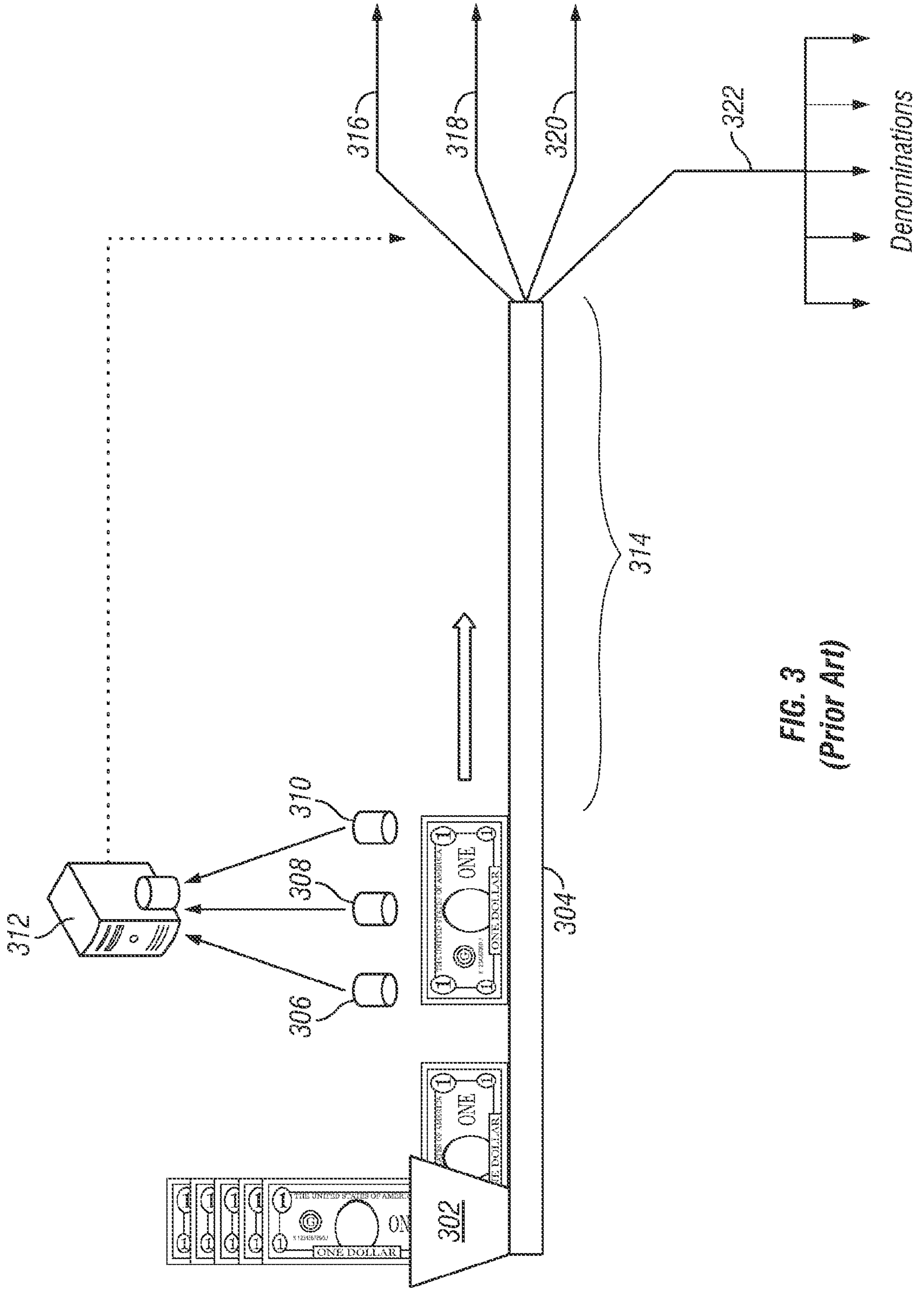
FIG. 3 (Prior Art)
FIG. 3 is a diagram of the basic operation of a typical bank note sorter or counter.

FIG. 3 depicts the operation of the typical bank note sorting machine. A stack of bank notes is first placed in an input receptacle, or hopper (302). A mechanism within the machine strips the notes from the stack and feeds them along the transport path (304) one note at a time. It is critical that the notes are processed individually, in order to properly evaluate the fitness condition of the given note.

As the note proceeds down the transport path (304), it passes various detectors (306-310). These detectors (306-310) serve to evaluate the fitness of the note to influence its disposition. For example, the Federal Reserve defines "fit currency" as: "a note that is suitable for continued circulation and is sufficiently clean to allow its genuineness and denomination to be readily ascertained;" and defines unfit currency as: "a note that is not suitable for further circulation because of its physical condition, such as torn, dirty, limp, worn or defaced." Other central banks follow similar criteria. Thus, in a typical fitness determination, each note is evaluated for mechanical defects (i.e., wear, tears, holes, missing portions, etc.); authentication (i.e., whether or not it is counterfeit); denomination; and soil.

Each detector (306-310) evaluates a different portion of the fitness determination equation. For example, each may be configured to sense or detect one or more predetermined characteristics on a note. These characteristics include, but are not limited to, size; thickness; color; magnetism; reflectivity; absorbability; transmissivity; conductivity; and the like. Such sensors may also be configured to conduct optical character recognition ("OCR") on a note. This capability allows for accurate determinations of denomination and other visible distinguishing characteristics for authentication. Each sensor or detector (306-310) may even employ a variety of sensing or detecting means including, but not limited to: a size detection device; density detection device; an upper optical scan head, a lower optical scan head, a magnetic sensor, a thread sensor, an infrared sensor, an ultraviolet/fluorescent light scan head, or even an image scanner.

After the note passes the sensors or detectors (306-310), the raw characteristic data obtained is gathered and logged in a local computing server (312). The computer (312) then processes the note characteristics and applies logic to make the fitness determination. This processing to determine fitness takes a period of time, introducing latency into the system. During this latency period, the note continues to travel along the transport path (304) at a constant speed. This latency period is shown on the figure as the "Decision Interval" (314).

At the end of the decision interval, the machine acts upon the fitness determination. For example, if the note is characterized as a counterfeit (316), it is directed into a particular output receptacle for further processing. (The Federal Reserve requires that the U.S. Secret Service be notified if counterfeit bills are detected.) Likewise, if the note is characterized as being suspect (318), it is directed to another particular output receptacle to allow for hand inspection.

If the note is unfit for circulation (320), it is directed to an entirely different output receptacle. For example, the serial number or date of the note may require that it be withdrawn from circulation. Likewise, if the note is excessively soiled or mechanically damaged it will be withdrawn from circulation. If, however, the note is characterized as fit for circulation (322), it is further separated into appropriate output receptacles ordered by denomination.

The speed of typical bank note counters varies. For example, some high-speed counters process notes at a throughput of up to 40 notes per second. This high speed translates to a very short period in which each note may be evaluated. Accordingly, the sensors and detectors (306-312) must be maintained in calibration.

Operation of a typical bank note flip counter with fitness detection capabilities is essentially the same as a currency sorter. A stack of notes is loaded into an input hopper where the notes are picked off one by one and transported to an output bin. Certain counters employ fitness detection circuitry similar to the aforementioned sorter. For example, the counter may watch for counterfeits or improper denominations and halt the process to allow the operator to remove the offending note. Others may also include sensors or detectors to evaluate a note's mechanical damage and level of soil. All counters maintain a count of the number of bills processed. This data is also reportable to the central bank for auditing and statistical purposes.

Figure 4:
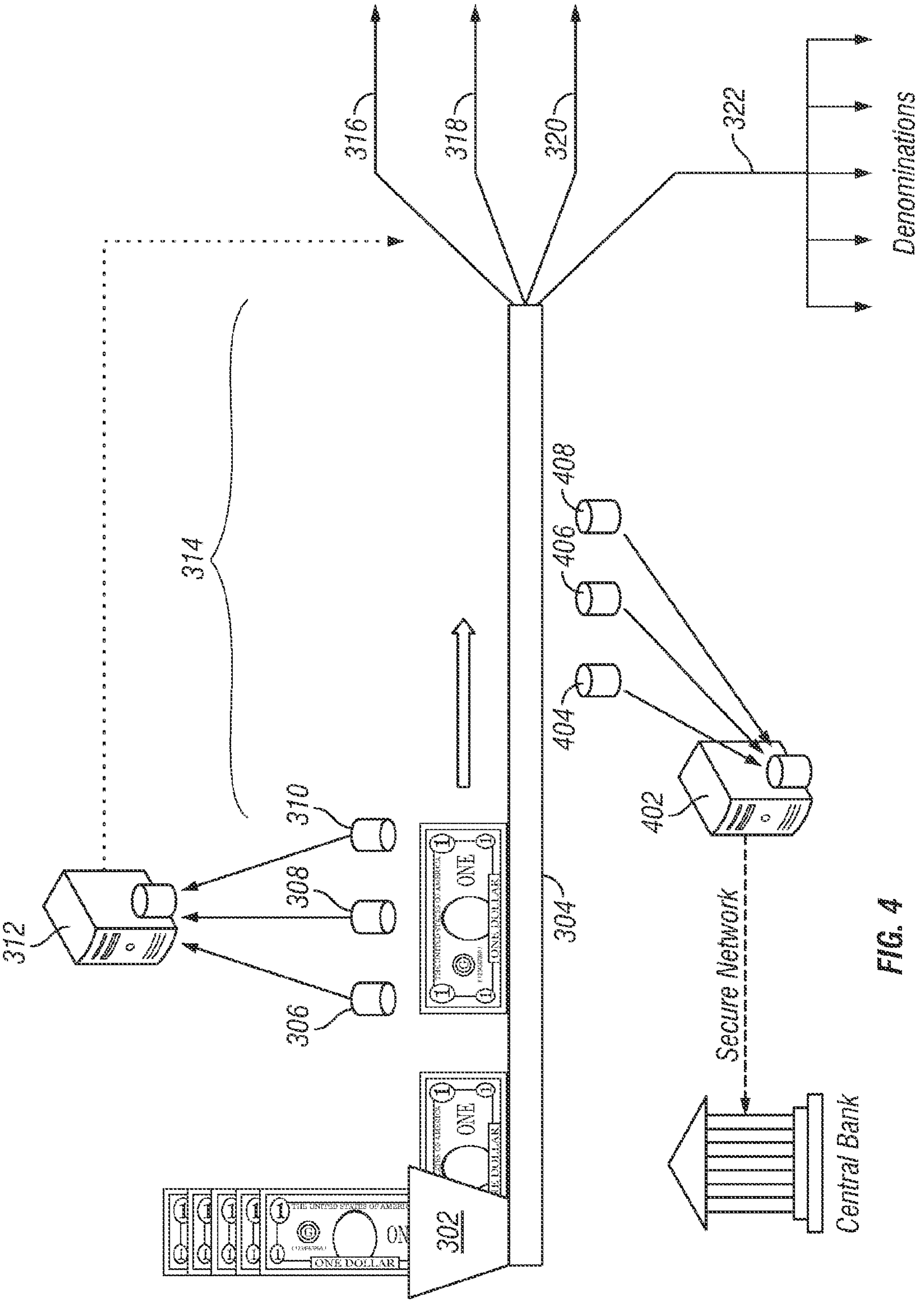
FIG. 4 is a diagram of an embodiment of the present invention with the independent evaluation circuitry placed along the transport path immediately prior to the point where the machine acts upon its bank note fitness evaluation determination.

FIG. 4 depicts a first embodiment of the present invention. In this embodiment, one or more independent sensors or detectors (404-408, together, the "independent detectors") are provided. The independent detectors (404-408) can be any standard detector used for bank note evaluation, or may be specialized detectors used to isolate particular note characteristics.

The independent detectors (404-408) sense or detect all or a subset of the bank note characteristics that the machine's primary sensors or detectors (306-310) sense or detect, including counterfeit detection. For example, each may be configured to evaluate one or more predetermined characteristics on a note such as: type of substrate; size; thickness; color; magnetism; reflectivity; absorbability; transmissivity; conductivity; and the like. Such sensors may also be configured to conduct optical character recognition ("OCR") on a note. This capability allows for accurate determinations of denomination and other visible distinguishing characteristics for authentication. Each independent detector (404-408) may even employ a variety of sensing or detecting means including, but not limited to: a size detection device; density detection device; an upper optical scan head, a lower optical scan head, a magnetic sensor, a thread sensor, an infrared sensor, an ultraviolet/fluorescent light scan head, or even an image scanner.

In this embodiment, the independent detectors are positioned along the sorter transport path (304) such that they utilize the decision interval (314) to examine the note. This position allows the independent detectors (404-408) to function without affecting the operation of the primary detectors (306-310).

Because the independent detectors (404-408) do not make sorting decisions, additional latency is not a factor. As such, one skilled in the art will appreciate that the exact location along the transport path is not limiting to the current invention. This is true, so long as the independent detectors are located at some point prior to the end of the decision interval (304) and the independent detectors do not affect or otherwise influence the primary detector (306-310) operation.

Once the note is evaluated by the independent detectors (404-408), the independent data is securely stored in a memory storage device, such as an independent computing database (402). The data is subsequently transmitted by some secure means to the central bank for auditing and statistical purposes.

Although three independent detectors (404-408) are shown, any number of detectors may be utilized depending upon the requirements of the particular sorting device. The number of detectors is not determinative; all combinations of detectors are within the scope of the present invention.

Data from the memory storage device (402) may be forwarded to the central bank or a designated commercial organization—such as, but not limited to: other banks, cash-in-transit companies (or "CIT", such as Brinks or Wells Fargo), commercial processors, bank note producers, substrate manufacturers, auditing third parties, etc.—in raw format or may be compiled into a specified report format. For example, a report may include, but is not limited to, specific machine data (such as throughput, errors, environmental factors, etc.); note denomination data; note soil level and mechanical wear data; productivity metrics; and timestamp data for the batch or for specific notes. Further, the data may be directly tied to a particular bank note or may be aggregated to refer to a particular batch. The actual contents of a report are not determinative, and all combinations of data are within the scope of the present invention. One skilled in the art will appreciate that collected data may be configured into any relevant specified format for a particular central bank or commercial organization.

Transmission of the data or reports from the memory storage device (402) to the central bank is made, preferably, through a secure means. For example, such secure means includes, but is not limited to, a secure Internet connection; a virtual private network ("VPN"); a private network; and a courier (such as by document, tape, hard drive, flash drive, DVD, or CDROM). Data may also be transmitted through insecure means, such as an open Internet connection. However, such unsecure transmission may be intercepted or altered which would impact its value as audit data. The data may also be encrypted during storage or transfer to prevent tampering. Wired or wireless connections may also be utilized. Further, the memory storage device may be mounted on the bank note processing device or may be external or even located offsite.

Because the independent detectors are not involved in any logic determinations, the memory storage device may be relatively simple. In another embodiment, the memory storage device is a simple network area storage drive. A controller means may extract data from the independent detectors (404-408) and write the raw data directly to the storage device.

In yet another embodiment, the memory storage device is a flash drive. This allows the independent data to be saved to the flash drive and the flash drive submitted to the central bank for processing. Use of a flash drive may be preferable with smaller bank note processing devices. Other embodiments may utilize a tape device to record the independent detector data. Further, the memory storage device may also be an offsite database that accepts data directly from the independent detector circuitry. The data may be transferred over any network means from the detectors to the offsite database—wired or wireless. The memory storage may also be volatile memory so long as the stored independent detector data is submitted to the central bank in some persistent format before the volatile memory is erased.

Figure 5:
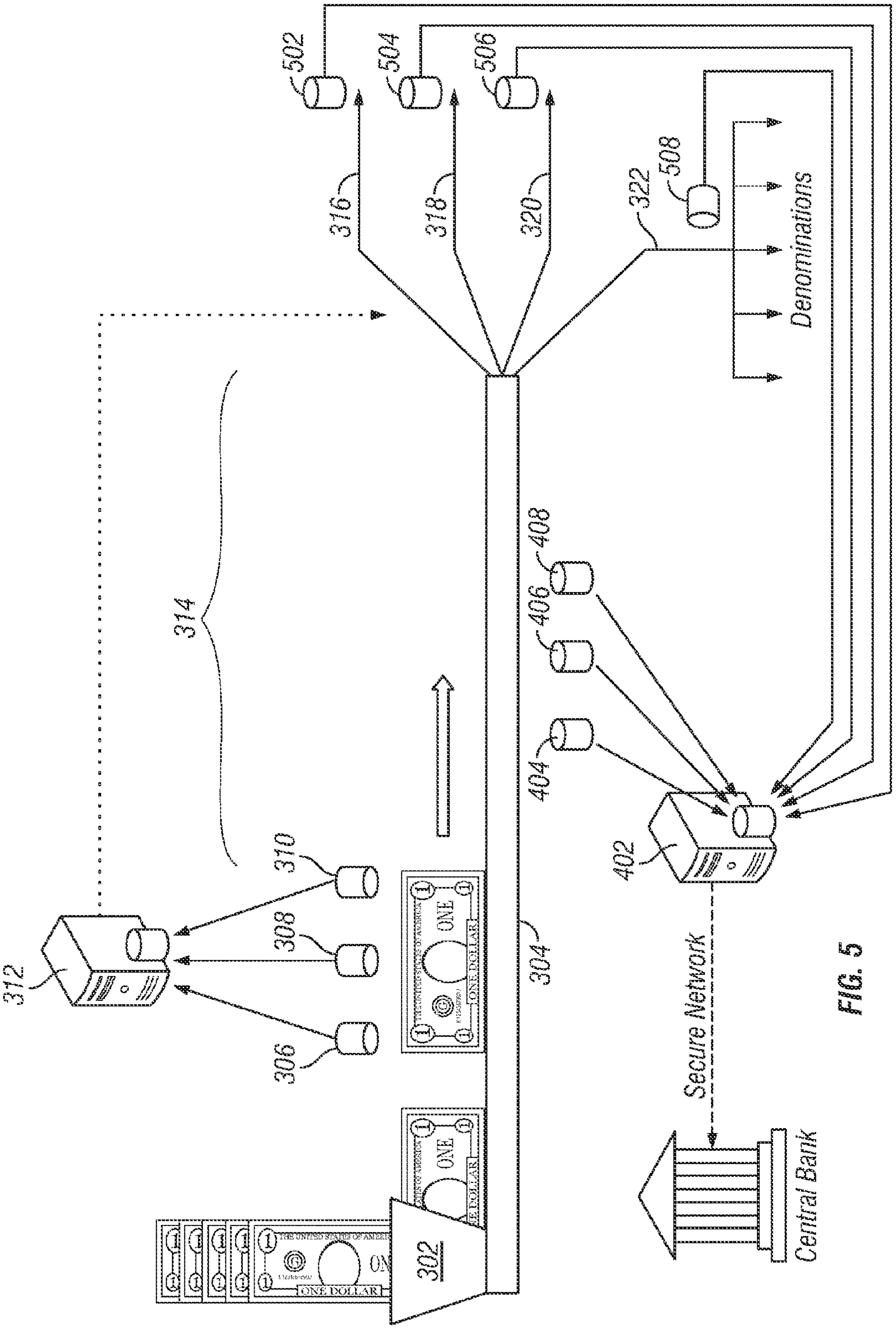
FIG. 5 is a diagram of an embodiment of the present invention with the independent evaluation circuitry placed both along the transport path immediately prior to the point where the machine acts upon its bank note fitness evaluation determination, and along the paths immediately following the point where the machine has acted on its fitness evaluation determination.

FIG. 5 depicts another embodiment of the present invention. In this embodiment, an additional set of independent detectors (502-508) is provided to allow independent verification of the sorter output logic. By monitoring the same or a subset of the note characteristics at this location, the central bank can monitor the machine's sorting logic for proper operation. For example, the primary detectors (306-310) may flag a note as unfit for circulation. If the note ends up in the "fit for circulation" bin (322), the corresponding output bin independent detector (508) would note this and a comparison of the data would indicate the error. In another example, a note processor has purposely altered the calibration of the primary detectors (306-310) such that unfit notes evaluate as "fit for circulation." At least one transport path independent detector (404-408) should note this discrepancy, as should an output independent detector (502-508).

Data from the additional set of independent detectors (502-508) is also saved in the memory storage device (402). To improve fault tolerance, an additional independent database may be added to either mirror the other database or to accept some portion of the detector outputs from any of the disclosed embodiments. One skilled in the art will appreciate that the number of memory devices utilized is not determinative and that all such combinations are within the scope of the present invention.

Figure 6:
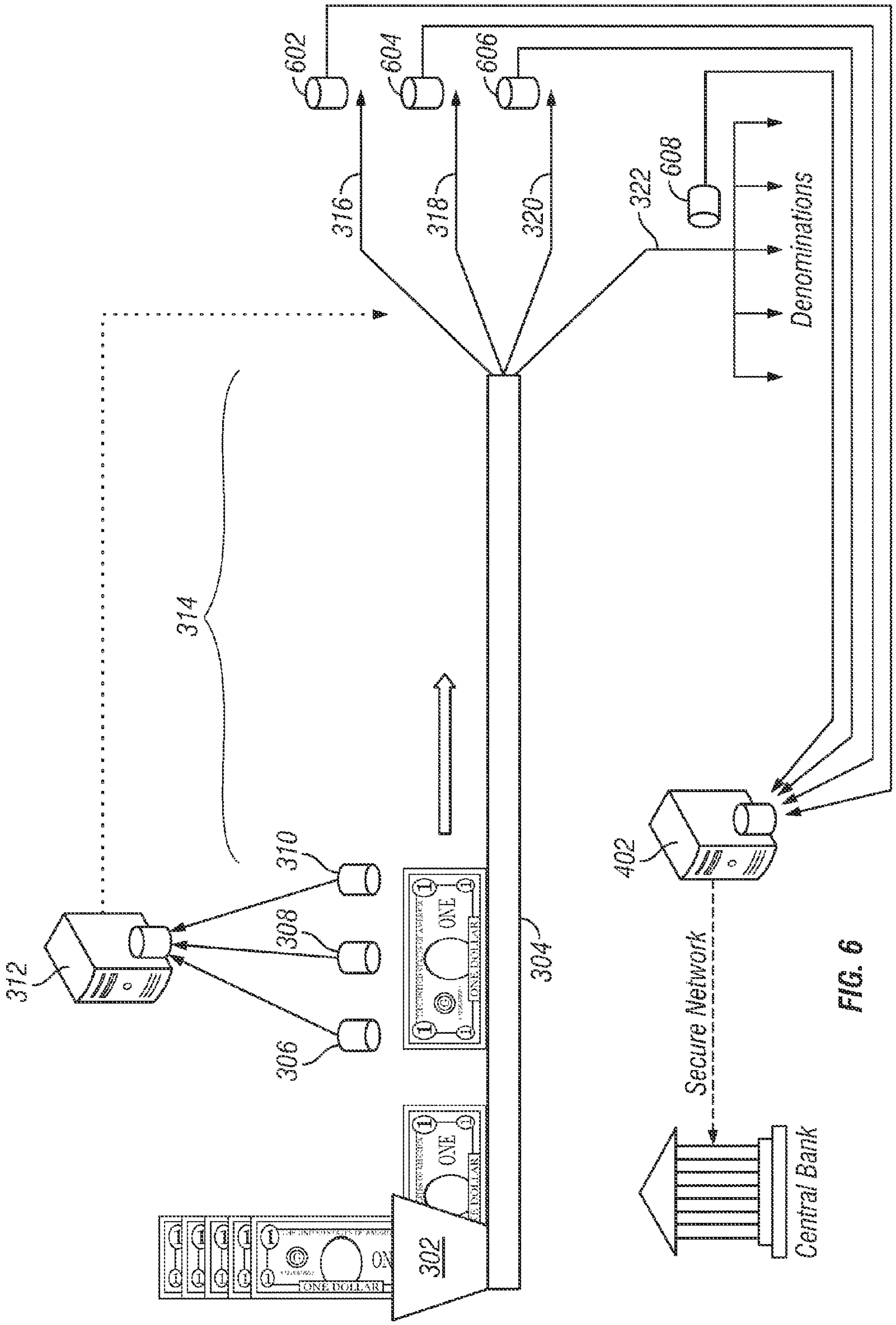
FIG. 6 is a diagram of an embodiment of the present invention with the independent evaluation circuitry placed only along the paths immediately following the point where the machine has acted on its fitness evaluation determination.

FIG. 6 depicts yet another embodiment of the present invention. In this embodiment, the independent detectors are provided on the output bins only (602-608). This embodiment may be necessary for machines wherein the pre-logic transport path (i.e., the path portion up to the point where the note evaluation logic is applied) is inaccessible or otherwise impractical for mounting independent detectors. In this embodiment the output bin detectors may provide bank note characteristic discrimination in unison with the primary detectors (306-308), or may be configured to provide a subset of the characteristic data.

To improve the reliability of the previous embodiments, the independent detector sets may be duplicated. Having redundant independent detectors allows comparison of two sets of independent data with the primary data, and may help to establish which detectors (i.e., independent or primary) are accurate. It would be helpful for the central bank to have independent corroborating data on hand when punishing a bank note processor for poor or improper performance.

In another embodiment, the transport path independent detectors are mirrored (i.e., duplicated) with an additional set of transport path independent detectors. Each independent detector submits bank note data to the independent computing database. Mirrored detectors allow for direct detector data comparisons to be made to verify the independent detector's integrity.

In another embodiment, the transport path independent detectors are mirrored by the output bin independent detectors. This allows characterization of a note as it passes along the transport path and as it passes into one of the output bins. Comparison of the data from two detectors will also assist in verifying the system's overall integrity.

While the previous embodiments describe use of the invention on bank note sorting machinery, the same technology is applicable to bank note counters as well. For example, many bank note flip counters utilize the same primary sensors to detect note fitness. This may be limited to authenticity or may extend to mechanical damage or soil level. Independent counter processing data may be gathered and reported to the central bank for conducting an audit of the note processor's counting system and practices.

One skilled in the art will appreciate that the present invention may also be applied to other equipment used in bank note processing, such as ATMs, teller assist devices, bank note recyclers, deposit systems, and the like. Any bank note processing system that utilizes bank note detectors to sense or detect any bank note characteristic is a candidate for the disclosed technology. Because the present invention operates as a stand-alone system—operating independently from the processing machine's detection equipment—it may be used to verify the operational integrity of any of these devices.

Figure 7:
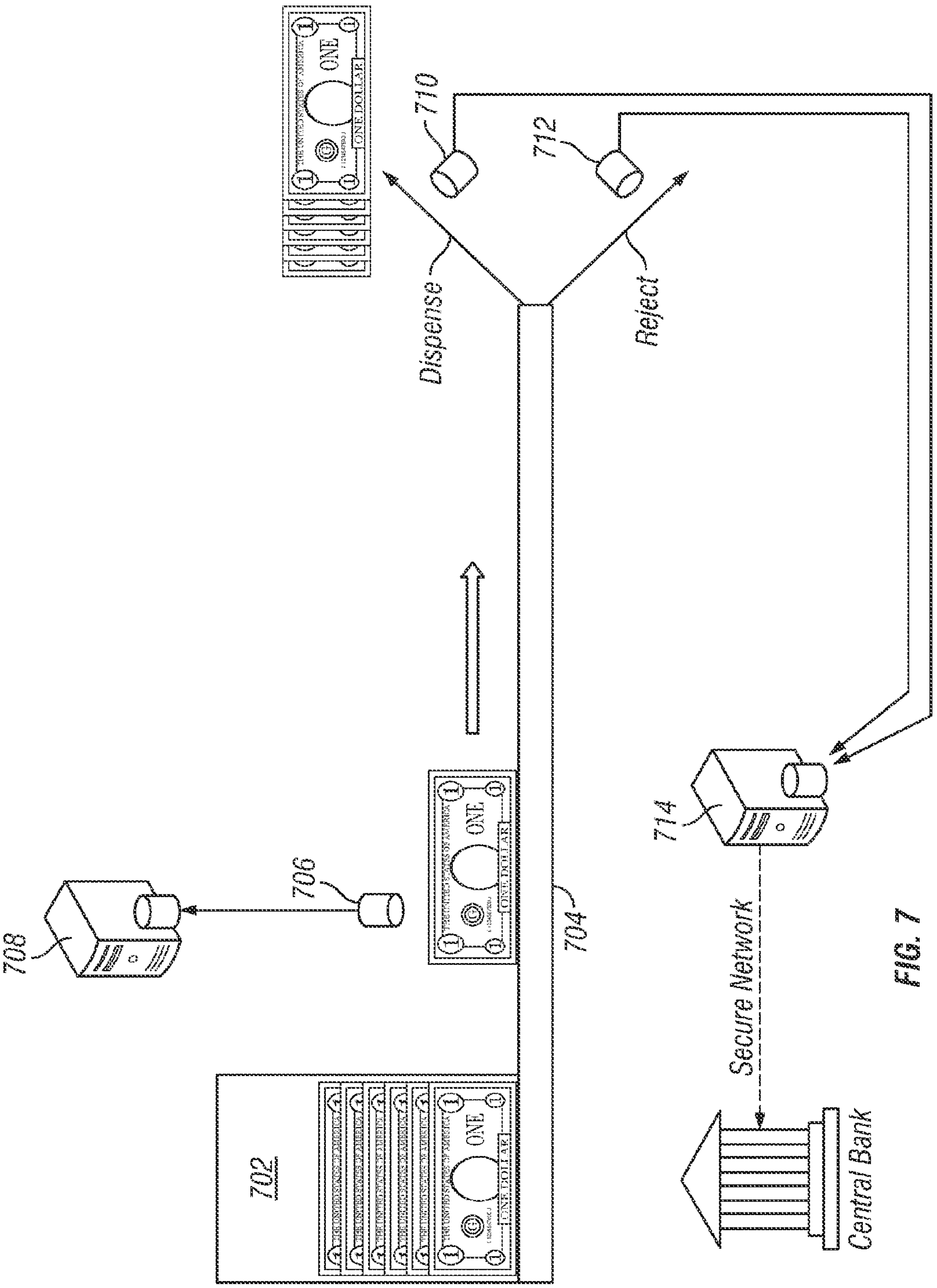
FIG. 7 is a diagram of an embodiment of the present invention as it is used with a typical ATM, with independent evaluation circuitry placed along the dispensing path to verify notes being dispensed and optionally on the rejection path to verify notes that are rejected.

FIG. 7 is a block diagram depicting an embodiment of the present invention as used with a typical ATM. The ATM is loaded with a stack of notes (702). As the notes are dispensed during a transaction (704), the notes pass at least one primary detector (706) on the ATM. Primary note data is acquired by this detector (706) and logged by the onboard processor (708). The present invention places at least one independent bank note detector (710) on the output to detect notes that are dispensed. The independent data acquired by the embodiment is logged in the memory storage device (714) and submitted to the central bank or commercial organization where it may be used to verify or audit the ATM's own sensors (706) or operation. In another embodiment, at least one additional independent bank note detector (712) is placed on the reject path to log data regarding notes rejected by the ATM. Likewise, this additional data may be compared against the other data to achieve a greater understanding of the ATM's overall operation. For redundancy and corroborating data, these sensors may be mirrored as well.

FIG. 8 is a block diagram depicting an embodiment of the present invention as used with a typical teller assist or cash recycling device. The device features an input bin (802) that accepts a stack of bank notes for processing. As the notes are processed, they each pass (804) at least one onboard device detector (806) that logs primary note data with the device's system processor (808). The notes are either accepted for recirculation or rejected. Accepted notes pass to an output receptacle (810) for recirculation. The present embodiment places at least one independent detector at the input (812) to detect notes as they enter the machine. This detector (812) gathers note information on notes that are accepted for processing. At least one additional sensor is placed at the output (814) to detect the notes that are accepted for recirculation. This independent data is logged by the memory storage device (818) and submitted to the central bank or commercial organization where it may be used to verify or audit the device's primary sensors (806) or operation. In another embodiment, an additional independent bank note detector (816) is placed on the reject path to log data regarding notes rejected by the device. Likewise, this additional data may be compared against the other data to achieve a greater understanding of the device's overall operation. For redundancy and corroborating data, these sensors may be mirrored as well.

FIG. 9 is a block diagram depicting an embodiment of the present invention as used with a typical self-service deposit device. Individuals place notes into the device (902). Each note passes (904) at least one device detector (906) that logs primary data with the device's system processor (908). Each note is then stored in an output receptacle (910). The present embodiment places at least one independent detector on the input (912) to detect notes as they are deposited. This independent data is logged by the memory storage device (914) and submitted to the central bank or commercial organization. From here, the independent data may be used to verify or audit the device's primary sensors (906) or operation. For redundancy and corroborating data, this sensor may be mirrored as well.

Because the present invention is intended to provide independent verification of a bank note processor's sorting or counting equipment and practices, it is subject to the same threat of tampering and falsification as are the primary detectors. Accordingly, the sensors and associated circuitry may be placed in tamper-resistant enclosures and/or located in areas of the machine that are either inaccessible to the bank note processor or are even in plain view such that tampering is readily detectable. Moreover, the sensors and associated circuitry may not be modified, adjusted, or serviced by the bank note processor entity, operator, or a third party without the central bank's knowledge or authorization.

To aid in determining system calibration, the central bank may provide each bank note processor with a set of standardized bank notes having predetermined characteristics. For example, the standardized note set may have one or more counterfeit notes, one or more torn/worn/soiled notes, one or more outdated notes, or some combination. Prior to any sorting operation, the standardized notes may be run to obtain the baseline. If there are no discrepancies between the independent data generated from the standardized notes and the expected data, it can be assumed that the detectors are properly calibrated. Likewise, any time the central bank issues a new note or changes a note's design, samples of the note may be provided to assist in calibrating and verify the calibration of a bank note processor's equipment.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise. (58,266).

We claim:

1. A method for providing independent verification of circulating bank notes by independently verifying the operation of a bank note processing device following processing of a plurality of bank notes, the device including a bank note transport path, at least one primary detector and primary detector controller for detecting or sensing at least one characteristic of a bank note being processed, the characteristic for use in bank note processing decisions, and a decision interval, the device having performed at least a subset of a fitness determination on the bank notes, the method steps comprising:

obtaining primary bank note processing data representing at least one of the characteristics of the bank notes as provided by the device's primary detector;

obtaining first independent bank note processing data from at least one independent bank note first detector or from at least one independent memory storage device in data communication therewith, wherein the at least one independent note first detector and the at least one independent memory storage device are each independent of the primary detector and the primary detector controller such that the operation of the at least one independent note first detector does not influence the bank note processing decisions of the primary detector controller, wherein the first independent bank note processing data represents at least one of the characteristics of the bank notes as provided by the device's primary detector; and comparing the primary bank note processing data with the first independent bank note processing data to verify or audit the primary detector operation.

2. The method of claim 1, the method steps further comprising:

submitting the primary bank note processing data and the first independent bank note processing data to a central bank or other commercial organization for verification or auditing of the primary detector operation.

3. The method of claim 1, the method steps further comprising:

obtaining second independent bank note processing data from at least one second detector that is independent of the primary detector and the primary detector controller such that operation of the at least one second detector operation does not influence bank note processing decisions of the primary detector controller, wherein the second independent bank note processing data represents at least one of the characteristics of the bank notes as provided by the device's primary detector; and comparing the primary bank note processing data with both the first independent bank note processing data and the second independent bank note processing data to verify or audit the primary detector operation.

4. The method of claim 3, the method steps further comprising:

submitting the primary bank note processing data, the first independent bank note processing data, and the second independent bank note processing data to a central bank or other commercial organization for verification or auditing of the primary detector operation.

5. A non-transitory computer readable medium tangibly embodying a program of machine-readable instructions executable by a computer processor to perform a method for providing independent verification of circulating bank notes by independently verifying the operation of a bank note processing device following processing of a plurality of bank notes, the device including a bank note transport path, at least one primary detector and primary detector controller for detecting or sensing at least one characteristic of a bank note being processed, the characteristic for use in a fitness determination of the bank note, and a decision interval, the device having performed at least a subset of a fitness determination on the bank notes, the program steps comprising:

obtaining primary bank note processing data representing at least one of the characteristics of the bank notes as provided by the device's primary detector;

obtaining first independent bank note processing data from at least one independent bank note first detector or from at least one independent memory storage device in data communication therewith, wherein the at least one first detector and the at least one independent memory storage device are each independent of the primary detector and the primary detector controller such that operation of the at least one first detector does not influence bank note processing decisions of the primary detector controller, wherein the first independent bank note processing data represents at least one of the characteristics of the bank notes as provided by the device's primary detector; and comparing the primary bank note processing data with the first independent bank note processing data to verify or audit the primary detector operation.

6. The computer readable medium of claim 5, the program steps further comprising:

submitting the primary bank note processing data and the first independent bank note processing data to a central bank or other commercial organization for verification or auditing of the primary detector operation.

7. The computer readable medium of claim 5, the program steps further comprising:

obtaining second independent bank note processing data from at least one second detector that is independent of the primary detector and the at least one primary detector controller such that operation of the at least one second detector operation does not influence bank note processing decisions of the primary detector controller, wherein the second independent bank note processing data represents at least one of the characteristics of the bank notes as provided by the device's primary detector; and comparing the primary bank note processing data with both the first independent bank note processing data and the second independent bank note processing data to verify or audit the primary detector operation.

8. The computer readable medium of claim 7, the program steps further comprising:

submitting the primary bank note processing data, the first independent bank note processing data, and the second independent bank note processing data to a central bank or other commercial organization for verification or auditing of the primary detector operation.

* * * * *